United States Patent [19]

Mangialardi

[11] Patent Number: 5,387,278
[45] Date of Patent: Feb. 7, 1995

[54] AIR-LIQUID SEPARATOR ASSEMBLY AND SYSTEM

[75] Inventor: John K. Mangialardi, Seabrook, Tex.

[73] Assignee: Grumman Aerospace Corporation, Long Island, N.Y.

[21] Appl. No.: 915,329

[22] Filed: Jul. 20, 1992

[51] Int. Cl.6 .................. B01D 19/00; B04B 5/08; B04B 5/12
[52] U.S. Cl. ........................... 96/174; 55/344; 55/345; 96/215; 96/216; 210/188; 244/159; 494/900
[58] Field of Search .............. 55/38, 40, 41, 160, 55/202, 203, 206, 315, 317, 338, 342, 345, 274, 409, 344; 210/90, 109, 110, 116, 117, 136, 188, 195.1, 259, 360.1, 512.1–512.3, 120, 137, 360.2, 787, 380.3; 208/DIG. 1; 244/158 R, 159, 163, 162; 95/243, 258, 259, 261; 96/175, 177, 215, 216, 217, 161, 174; 494/2, 5, 10, 43, 362, 900

[56] References Cited

U.S. PATENT DOCUMENTS

| | | | |
|---|---|---|---|
| 1,541,163 | 6/1925 | Westhafer et al. | 210/380.3 |
| 2,712,897 | 7/1955 | Kusserow et al. | 96/177 |
| 3,213,592 | 10/1965 | Rich | 494/900 |
| 3,224,173 | 12/1965 | Webb | 494/900 |
| 3,276,679 | 10/1966 | Booth | 494/900 |
| 3,405,454 | 10/1968 | Zeff | 244/163 |
| 3,653,842 | 4/1972 | Putman | 208/DIG. 1 |
| 3,749,332 | 7/1973 | Gray | 244/163 |
| 3,791,575 | 2/1974 | Kartinen et al. | 210/90 |
| 4,053,399 | 10/1977 | Donnelly et al. | 210/195.1 |
| 4,702,309 | 10/1987 | Frank | 244/163 |
| 4,976,754 | 12/1990 | Edelstein et al. | 96/156 |
| 5,005,787 | 4/1991 | Cullingford | 244/163 |

*Primary Examiner*—Joseph W. Drodge
*Attorney, Agent, or Firm*—Bacon & Thomas

[57] ABSTRACT

A system for separating an air-liquid mixture in a low gravity environment is disclosed having a high speed separator to initially process the air-liquid mixture. A second, low-speed separator has its inlet connected to the liquid discharge outlet of the high speed separator in order to remove the entrained air bubbles from the liquid discharge of the high speed separator. The low speed separator has a stationary housing enclosing a rotating, paddle-type separator. The housing defines a liquid collector portion which communicates directly with a liquid discharge outlet. Air removed by the low speed separator may be vented to the ambient atmosphere, or may be returned to the air-liquid mixture inlet of the high speed separator.

22 Claims, 2 Drawing Sheets

AIR-LIQUID SEPARATOR ASSEMBLY AND SYSTEM

BACKGROUND OF THE INVENTION

The present invention relates to a system for separating an air-liquid mixture, as well as a separator assembly to be used in this system. The assembly and the system finds particular use in separating air-liquid mixtures in low gravity environments.

In zero gravity or low gravity environments, such as those found in spacecraft and space stations, airflow is used to entrain free floating liquid. The mixture is then processed through phase separators which return the air to the ambient atmosphere and transfer the separated liquid to other processing equipment. The known separators operate at high speeds, on the order of several thousand rpm, which results in the entrainment of air bubbles in the liquid output. This is particularly troublesome when the liquid contains any soaps or foaming agents The known high speed separators provide excellent separation of air (or any gas) from the liquid. The separation of air from liquid is coarse and partially controlled only by applying very high back pressure on the liquid discharge line. Low speed or non-rotating separators (such as cyclone or vortex separators) do not provide the level of air separation as the high speed separators, nor are they as dependable.

SUMMARY OF THE INVENTION

A system for separating an air-liquid mixture in a low gravity environment is disclosed having a high speed separator to initially process the air-liquid mixture. A second, low-speed separator has its inlet connected to the liquid discharge outlet of the high speed separator in order to remove the entrained air bubbles from the liquid discharge of the high speed separator. The low speed separator has a stationary housing enclosing a rotating, paddle-type separator. The housing defines a liquid collector portion which communicates directly with a liquid discharge outlet. Air removed by the low speed separator may be vented to the ambient atmosphere, or may be returned to the air-liquid mixture inlet of the high speed separator.

DETAILED DESCRIPTION OF THE PREFERRED EMBODIMENT

Figure 1:
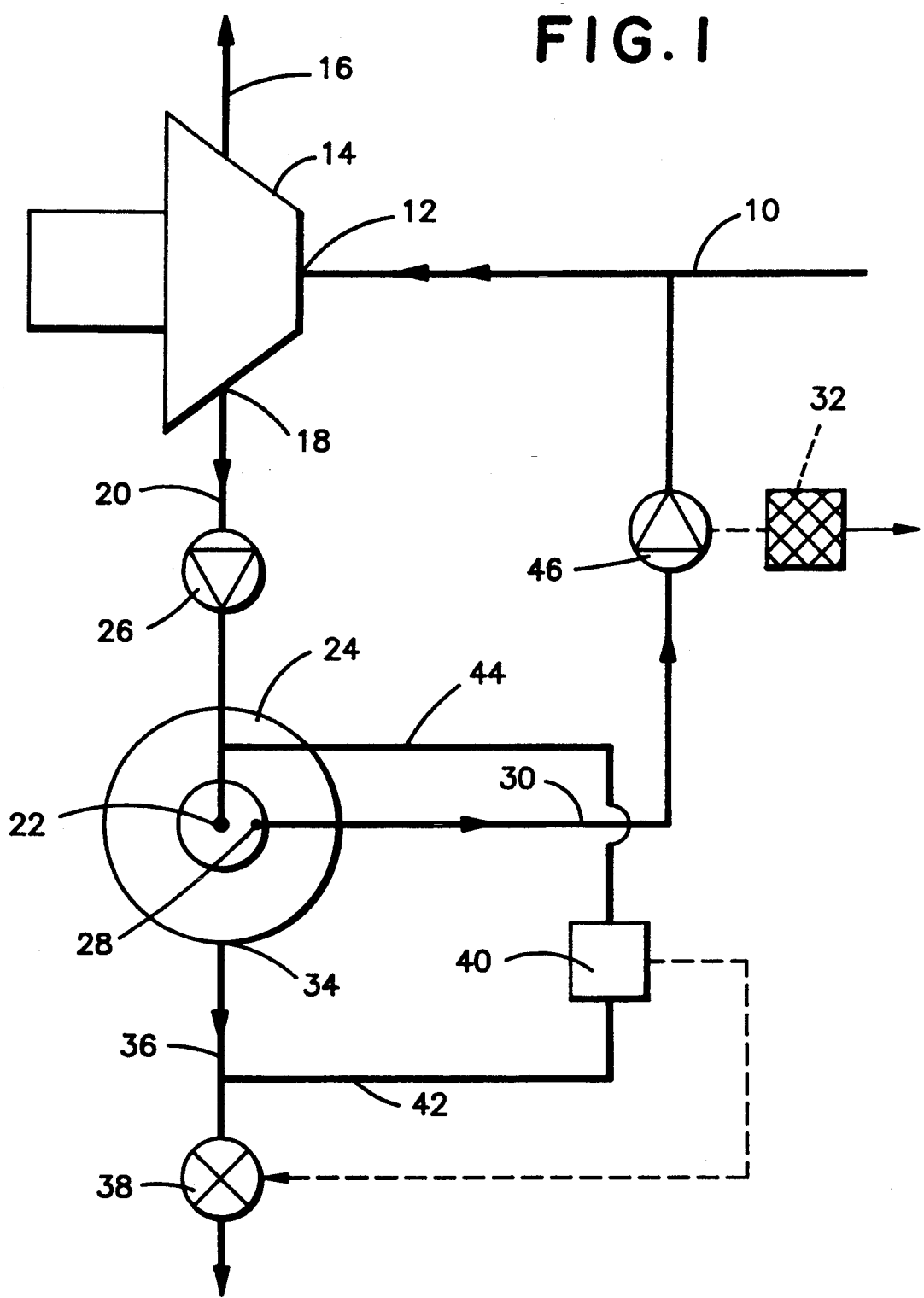
FIG. 1 is a schematic diagram of the air-liquid separating system according to the present invention.

The system according to the invention, as illustrated in FIG. 1, comprises an air-liquid mixture inlet line 10 to direct the air-liquid mixture into a mixture inlet 12 of a high speed separator 14. Separator 14 may be any type of known, high-speed separator and has an air outlet line 16 and a liquid outlet 18. A conduit 20 interconnects the liquid outlet 18 of the high speed separator 14 to a mixture inlet 22 of a low-speed separator 24. A check valve 26 is located in conduit 20 to allow fluid flow only in the direction from the high speed separator toward the low speed separator and to prevent any return flow.

Low speed separator 24 has an air outlet 28 to which is connected an air outlet conduit 30. Conduit 30 may direct the removed air back into the air-liquid inlet 10 of the high speed separator 14 or, alternatively, may vent the air to the ambient atmosphere after passing through filter 32, illustrated in dashed lines in FIG. 1.

A liquid discharge outlet 34 is also defined by low speed separator 24 to which is connected liquid discharge conduit 36. Control valve 38 is operatively interposed in liquid conduit 36 to control the flow of the liquid through the conduit. Control valve 38 is controlled by differential pressure transducer 40 which has means to sense the pressure of the liquid collected in the low speed separator 24, through line 42, and a static pressure reference line 44 connected to the air-liquid inlet conduit 20.

A positive pressure is maintained within the interior of the low speed separator 24 by establishing pressure opening settings for check valve 26 and bleed valve 46, which is operatively interposed in the air bleed line 30. Bleed valve 46 should be set to a higher opening pressure than check valve 26 to generate a positive pressure within low speed separator 24 which pumps the collected liquid out of the separator. Typical pressure settings are an opening pressure of 1 psi for check valve 26 and an opening pressure of 20 psi for bleed valve 46. Quite obviously, other settings may be utilized depending upon the specific application of the system. The function of valve 26 is solely to prevent back flow from separators 24 when the separators are not operating.

As the liquid accumulates in the low speed separator 24 it generates an increased pressure on differential pressure transducer 40. If the separator is rotated at a given speed, the pressure will be a function of the mass of the liquid being accumulated in the separator. Once the pressure of the liquid reaches a predetermined value, differential pressure transducer 40 will open valve 38, thereby allowing the liquid to flow out of the separator through outlet 34 and conduit 36. The positive pressure within the low speed separator 24 will act as a pump to urge the liquid out of the separator.

Figure 2:
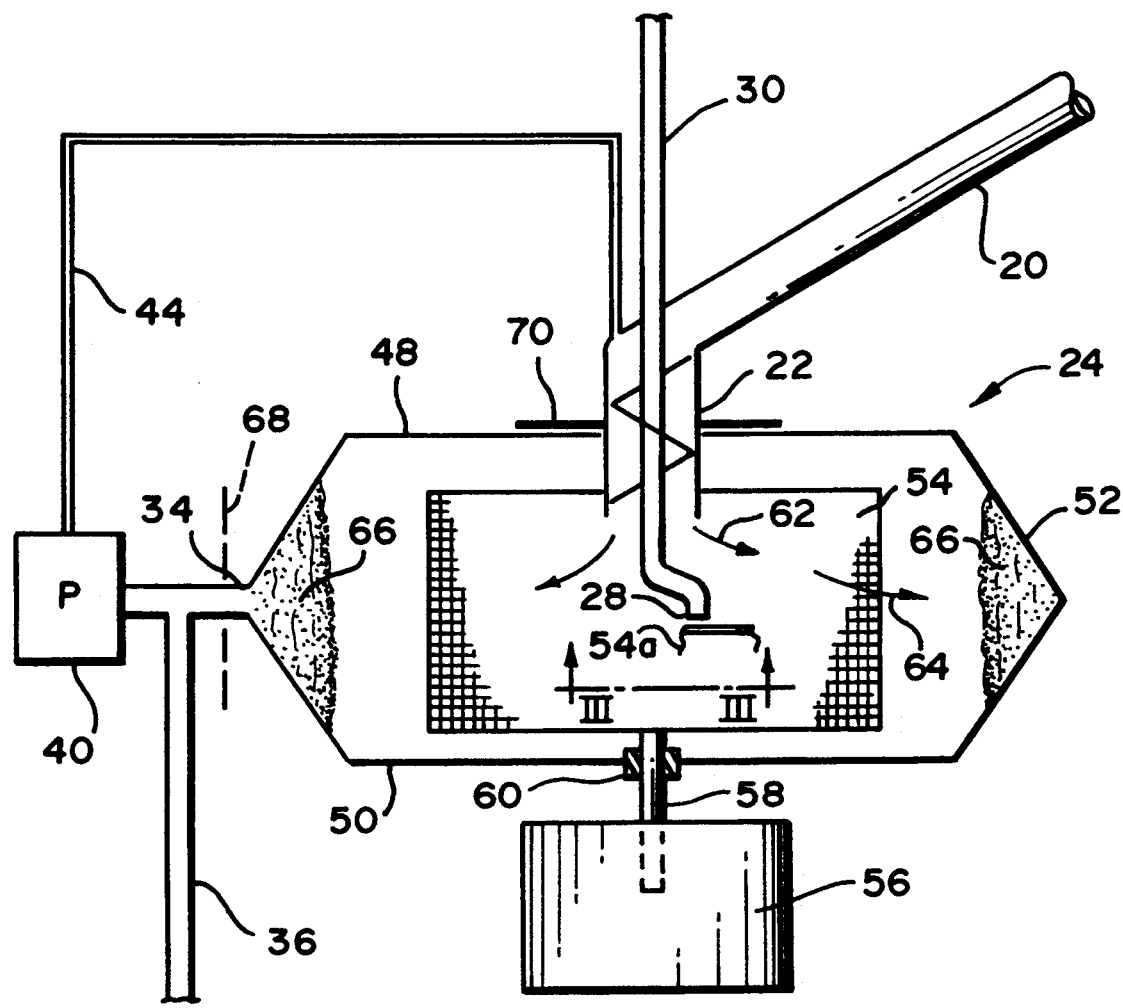
FIG. 2 is a cross-sectional view of the low speed separator used in the system illustrated in FIG. 1.
Figure 3:
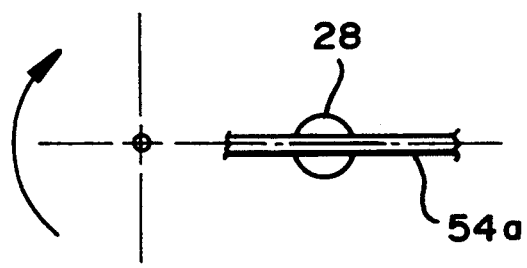
FIG. 3 is a partial, cross-sectional view taken along line III—III in FIG. 2.

The low speed separator 24 is shown in detail in FIG. 2. As can be seen, the separator 24 has a stationary housing comprised of upper and lower walls 48 and 50 spaced apart and interconnected by a sidewall 52 having a generally "V" shaped cross-sectional configuration. The area between the legs of the "V" define a liquid collector portion of the low speed separator 24.

Rotatably enclosed within the housing is a paddle-type separator member 54 that is rotated by motor 56 mounted exteriorly of the housing. The connection between the motor 56 and the separator member 54 may be via a shaft 58 having a dynamic seal 60 interposed between it and wall 50. Alternatively, a known magnetic coupling may be utilized between these elements such that the motor 56 may rotate the separator 54.

Separator 54 has a generally hollow, cylindrical configuration such that the interior of the separator member 54 communicates directly with the mixture inlet 22 as well as the air outlet 28. The separator member 54 has vanes 54a extending internally and externally of its cylindrical walls and may also comprise a disposable filter basket providing filtration of solids from the processed liquid. Typical filtration requirements for the space station or 100 microns. The filter material also enhances the debubbling function of the separator, in addition to providing a large capacity filter. Motor 56 rotates the separator member 54 at a speed of less than 300 rpm for a typical 6-8 inches diameter separator.

The air-liquid mixture enters the interior of the separator member 54 indicated by arrows 62. The rotation of the separator member 54 causes the air bubbles to separate from the liquid and pass out through the air opening 28 in air bleed conduit 30. The air opening 28 is offset from the axis of rotation 20 that the inlet opening may be wiped by the internal vanes of member 54 thus removing any liquid droplets that may contact the tube. The liquid component of the mixture passes radially outwardly through the separator member 54, as illustrated by arrow 64 and collects in the radially outermost portions of the "V" shaped sidewalls 52. The rotation of the separator member 54 imparts a similar rotation to the liquid, thereby causing it to collect at the sidewall 52, as illustrated at 66. As noted previously, continued accumulation of the liquid at 66 will increase the pressure on differential pressure transducer 40 in order to control the operation of valve 38.

The low speed separator according to this invention is completely enclosed and may be attached to the remaining elements of the system by quick-disconnect couplings illustrated schematically at 68 and 70. Motor 56 may also be attached to the liquid separator 54 via a quick-disconnect coupling.

The present invention uses a high speed separator for air separation and a low speed separator for further liquid separation or debubbling. It takes advantage of the high pressure potential of the high speed separator to pressurize the low speed separator, thereby eliminating the need for pumps to remove the liquid from the low speed separator. The pressure differential maintained in the interior of the low speed separator effectively "pumps" the liquid out of the separator. Because of the relatively large volume available in the low speed separator, as well as the low liquid velocities, the low speed separator also functions as a large capacity dynamic filter for filtering the liquid.

The foregoing description is provided for illustrative purposes only and should not be construed as in any way limiting this invention, the scope of which is defined solely by the appended claims.

I claim:

1. A system for separating an air-liquid mixture in a low gravity environment comprising:
   a) a first, rotatable separator coupled to means capable of effecting high speed separator rotation and having an air-liquid mixture inlet, an air outlet and a liquid outlet;
   (a) a second, rotatable separator coupled to means capable of effecting relatively lower speed separator rotation and having a mixture inlet connected to the liquid outlet of the first separator, an air bleed outlet and a liquid discharge outlet, the second separator comprising a debubbler to remove air bubbles entrained in the liquid discharaged from the first separator;
   c) pressure actuated check valve means operatively interposed in a conduit connecting the liquid outlet of the first separator to the mixture inlet of the second separator such that liquid may only flow from the first separator toward the second separator, the check valve opening to allow such flow at a pressure of $P_1$;
   d) a pressure actuated bleed valve operatively located in a conduit connected to the air bleed outlet of the second separator, the bleed valve opening at a pressure $P_2$ to permit flow through the conduit such that $P_2 > P_1$, thereby maintaining a positive air pressure within the second separator;
   e) outlet valve means operatively associated with the liquid discharge outlet of the second separator to control the flow of liquid from the second separator: and,
   f) pressure sensing control means operatively associated with the second separator and the outlet valve means to sense the pressure of the liquid in the second separator and open the outlet valve means when the pressure of the liquid reaches a predetermined value.

2. The system of claim 1 further comprising conduit means interconnecting the bleed valve to the mixture inlet of the first separator.

3. The system of claim 1 further comprising vent means connected to the bleed valve to vent the air flowing through the bleed valve to ambient atmosphere.

4. The system of claim 3 further comprising filter means operatively associated with the vent means to filter the air flowing through the vent means.

5. The system of claim 1 wherein the second separator comprises:
   a) a stationary housing having the mixture inlet and the liquid discharge outlet;
   b) a separator member rotatably located within the stationary housing so as to rotate about an axis; and,
   c) drive means to rotate the separator member.

6. The system of claim 5 wherein the mixture inlet is generally coaxial with the axis of rotation of the separator member.

7. The system of claim 6 wherein the separator member is generally cylindrical in configuration and wherein the mixture inlet communicates with the interior of the cylinder.

8. The system of claim 7 wherein the separator member comprises a filter basket having internal and external vanes.

9. The system of claim 5 wherein the stationary housing defines a liquid collection portion and wherein the liquid discharge outlet communicates with the liquid collection portion.

10. The system of claim 9 further comprising:
    conduit means connected to the liquid discharge outlet such that the outlet
    valve menas is located in the conduit means so as to control the flow of liquid through the conduit means and wherein the
    pressure sensing control means is operatively associated with the liquid discharge outlet and the outlet valve means to sense the pressure of the liquid collected in the liquid collector portion and to open the outlet valve means when the sensed pressure reaches a predetermined value.

11. The system of claim 10 further comprising a static pressure conduit interconnecting the pressure sensing control means and the mixture inlet.

12. The system of claim 5, wherein the drive means rotates the separator member at less than 300 rpm.

13. The system of claim 5 wherein the stationary housing comprises:
    a) upper and lower, spaced apart walls each having a generally circular configuration; and,
    b) a sidewall interconnecting the upper and lower wall having a generally "V"-shaped cross-sectional configuration to define a liquid collector portion between the legs of the "V".

14. A separator for removing air bubbles from an air-liquid mixture comprising:
   a) a stationary housing having a mixture inlet, a liquid discharge outlet and an air outlet and comprising:
      i) upper and lower, spaced apart walls each having a substantially planar circular configuration; and,
      ii) a sidewall interconnecting the upper and lower walls having a generally V-shaped cross-sectional configuration defining a liquid collector portion between the upper and lower spaced walls;
   b) a separator member rotatably located within the housing having walls which generally define a cylinder with respect to an axis which extends generally transversely to the upper and lower walls of the housing; and,
   c) drive means to rotate the separator member about the axis.

15. The separator of claim 14 wherein the mixture inlet is generally coaxial with the axis of the separator member.

16. The separator of claim 15 wherein the mixture inlet communicates directly with the interior of the cylinder.

17. The separator of claim 16 wherein the air outlet communicates directly with the interior of the separator member to withdraw air separated from the liquid.

18. The separator of claim 16 wherein the separator member comprises a filter basket having internal and external vanes.

19. The separator of claim 14 wherein the drive means rotates the separator member at less that 300 r.p.m.

20. The separator of claim 14 wherein the liquid discharge outlet communicates with the liquid collector portion.

21. The separator of claim 20 further comprising:
   a) conduit means connected to the liquid discharge outlet;
   b) valve means in the conduit means to control the flow of liquid through the conduit means;
   c) pressure sensing control means operatively associated with the liquid discharge outlet and the valve means to sense the pressure of the liquid collected in the liquid collector portion and to open the valve means when the sensed pressure reaches a predetermined value.

22. The separator of claim 21 further comprising a static pressure conduit interconnecting the pressure sensing control means and the mixture inlet.

* * * * *